United States Patent [19]

Michaels et al.

[11] 4,226,508

[45] Oct. 7, 1980

[54] VIEWING AND ANGLING DEVICE FOR ICE FISHING

[75] Inventors: Dennis C. Michaels, Buffalo; Michaels, John W., Chanhassen, both of Minn.

[73] Assignee: D.J.L.J., Inc., Buffalo, Minn.

[21] Appl. No.: 11,116

[22] Filed: Feb. 12, 1979

[51] Int. Cl.³ .............................................. G02B 5/02
[52] U.S. Cl. ................................................... 350/319
[58] Field of Search ................................. 350/319, 58

[56] References Cited

U.S. PATENT DOCUMENTS

| 1,675,964 | 7/1928 | Weinreich | 350/319 |
| 2,746,194 | 5/1956 | Lonnman | 350/319 |

FOREIGN PATENT DOCUMENTS 501710  3/1939  United Kingdom ...................... 350/58

Primary Examiner—Jon W. Henry
Attorney, Agent, or Firm—Schroeder, Siegfried, Ryan, Vidas, Steffey & Arrett

[57] ABSTRACT

A fishing and viewing device for ice fishing which permits an ice fisherman to view his bait and line through a hole cut in the ice. The device is positioned above the hole in the ice while a cylindrical insert is positioned in the ice fishing hole in the ice. The flanged upper end of the cylindrical tube can be readily connected to and disconnected from the upper viewing and angling access unit.

4 Claims, 2 Drawing Figures

VIEWING AND ANGLING DEVICE FOR ICE FISHING

This invention relates to a viewer and angling device used for ice fishing.

An object of the invention is to provide a viewing and angling unit with an optical viewing system to permit observation of a fishing line and lure through a layer of ice and water. The viewer and angling device is equipped with a flanged cylindrical tube which is fitted into the access hole bored in the ice to improve the visual acuity of the system by reducing the amount of stray light entering the viewing path through the translucent ice.

A further object of the invention is to provide an ice fishing device for use with access holes of several diameters wherein flanged tubes of varying diameters can be readily connected to and disconnected from the above-the-ice portion of the device. These, together with other objects and advantages which will become subsequently apparent, consist in certain features of construction and the combination and arrangement of the parts hereinafter fully described as illustrated in the accompanying drawings, in which.

Figure 1:
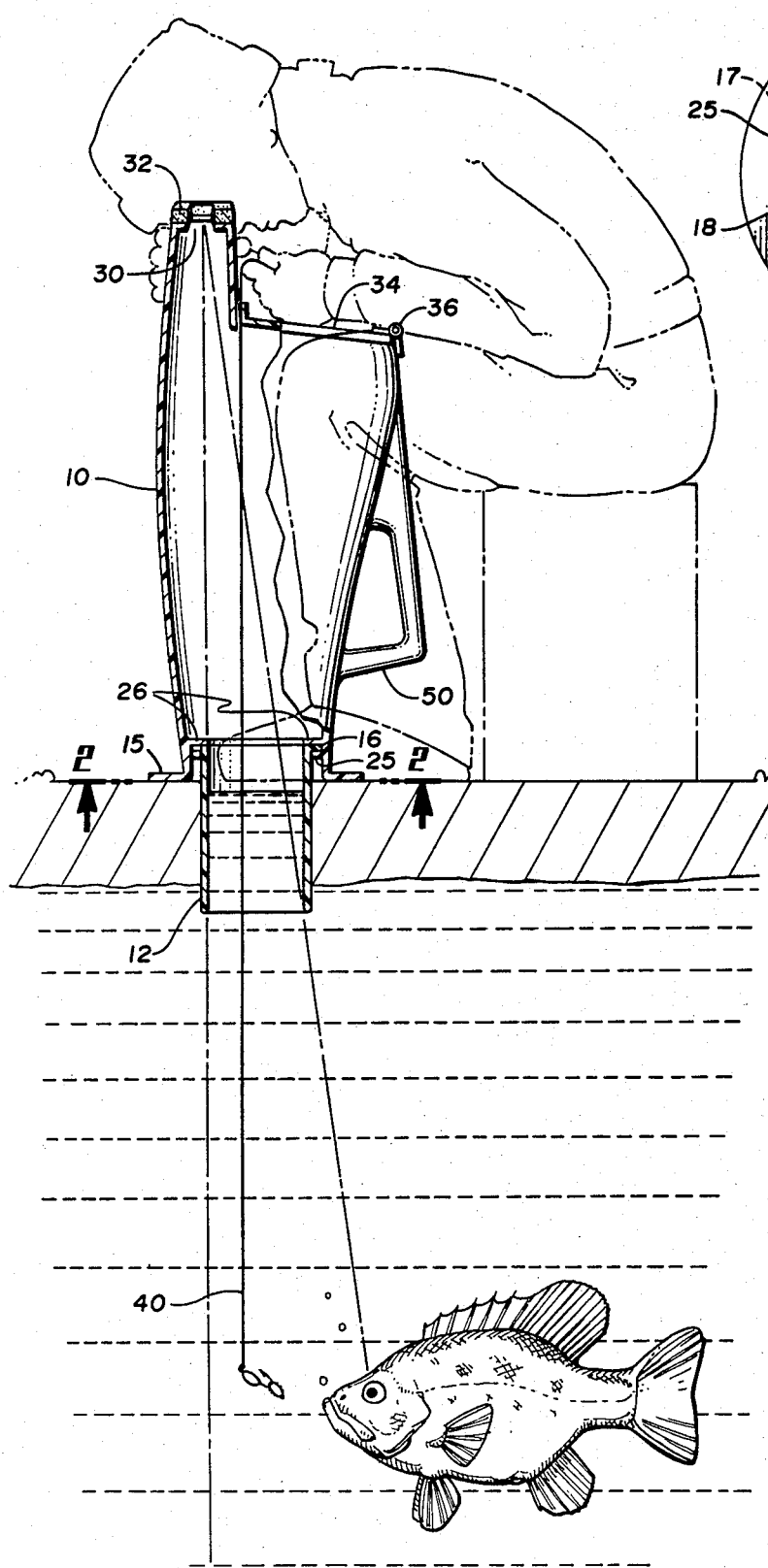
FIG. 1 is a cross-sectional view of the device in use.

The upper housing portion 10 and a lower tubular portion 12 of the viewing and angling device are shown in use for ice fishing in FIG. 1. The lower portion 12 is a tubular member having a diameter slightly less than that of the ice fishing hole bored in the surface of the ice 14. The base of upper portion 10, shown in the drawings as outwardly extending flange 15, engages the ice around the hole.

Figure 2:
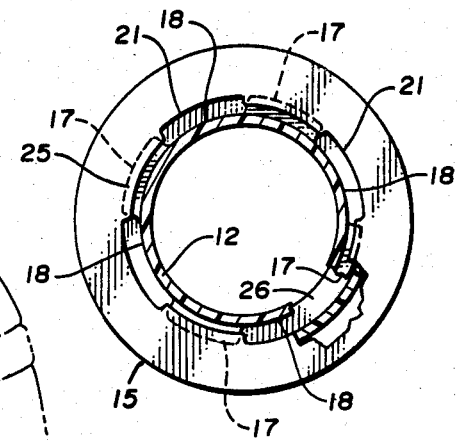
FIG. 2 is a bottom-sectional plan view taken along line 2—2 of FIG. 1.

The top of the cylindrical tube 12 has a flanged portion 16 around its circumference. As shown in FIG. 2, the flanged portion 16 consists of several portions 17 projecting well beyond the wall of the tubular portion 12 and other portions which are either flush with the surface of pipe portion 12, or only slightly projecting therefrom. The projecting portions 17, as shown in FIG. 2, cooperate with slots 21, which interrupt the inner circumference of an inner flange 25 located near the base of the upper portion 10 of the device.

The tubular portion 12 is connected to the upper portion 10 by aligning its projecting portions 17 with slots 21 in inner flange 25, and inserting it, and then rotating the tubular member 12 relative to housing 10 until the projecting flanges 17 engage the non-slotted portions of inner flange 25 to secure portion 12 in place.

Similarly, the pipe unit can be separated from the upper portion 10 by rotating the pipe or tube 12 relative to the unit 10 to align the projecting portions 17 with slots 21, so that the pipe 12 can be removed from the unit 10 along the axis of the unit. An upper inner flange 26 prevents the pipe unit from moving an excessive vertical distance within the body of unit 10.

Various diameter pipes 12 can be utilized with a single upper portion 10. For example, in FIG. 1, a smaller diameter pipe 12 can be utilized by having a relatively smaller diameter tubular portion 12 with a flanged portion 26, having the same outside diameter as the unit shown, to permit interface with the same lower inside flange 25 of the upper unit. Thus, it is possible to supply an ice fishing unit with several pipe units of varying diameter corresponding to the diameters of holes provided by the most popular available ice augers.

The upper portion of the device 10 includes a viewing port 30 surrounded by a padded portion 32 to make long-term viewing with the device comfortable. An access door 34 is mounted with a hinge 36 on the lip of the unit 10. The door can be swung away to permit insertion of the fishing line 40 and removal of the line or line and fish when desired.

The door 34 and the body of the unit 10 permit vertical movement of the line while the door 34 is in a closed position and provide a means for easily removing fish as they are caught.

The geometry of the upper unit is such that using the unit in the manner shown in the phantom outline of the fisherman in FIG. 1 permits surveilance of the line and bait below the ice and the water. The sight line through the viewing port 32 and the housing 10 permits a clear field of view of the line and the bait at normal fishing depths. The plumb line defined by fishing line 40 intersects the sight line from viewing port 30 through the tubular member 12 throughout the range of depths where fishing is desired.

The tubular portion 12 has been formed from opaque materials to enhance the user's ability to see fish in the water by reducing the amount of ambient light entering the optical field or sight line through the ice. The housing 12, itself, serves to block out other undesired ambient light to give a user the benefit of "dark house" ice fishing without the necessity of constructing a complete fishing shack on the surface of the ice to block out ambient light and permit unobstructed viewing of fish.

A handle 50 is provided to permit the unit to be easily carried.

We claim:

1. A device for viewing objects in water located below a hole in a layer of ice covering a body of water, said device comprising:

a housing portion having a base for engaging the ice around said hole, a viewing port and a lower port, said viewing port and lower port located along a substantially vertical sight line through said housing portion; and a substantially opaque tubular member, open at both ends, connected to said lower port and extending below the base of said housing, the substantially vertical sight line of said housing portion passing through said tubular member, and said tubular member being of sufficient length that at least a portion of said tubular member may be extended through said hole in the ice covering said body of water to minimize the amount of stray light impinging upon the optical path along said vertical sight line.

2. The invention of claim 1 wherein said tubular member is connected to said housing portion by insertion of a flanged projection around the circumference of said tubular member into an interfitting flange located in the vicinity of said lower port of said housing.

3. The invention of claim 1 wherein said housing portion includes a fishing access port through which the fishing line may be inserted, a fishing access port being positioned at a location relative to said viewing port such that a plumb line from said fishing access port through said housing of said tubular member intersects said substantially vertical sight line at a depth in said body of water corresponding to the depth at which ice fishing is intended.

4. The invention of claim 3 wherein said fishing access port includes a hinged door to permit removal of a fish from said body of water through said tubular member and said housing member.

* * * * *